United States Patent
Dorfi

(10) Patent No.: US 8,955,374 B2
(45) Date of Patent: Feb. 17, 2015

(54) FOOTPRINT TEST APPARATUS AND METHOD OF USE

(71) Applicant: Bridgestone Americas Tire Operations, LLC, Nashville, TN (US)

(72) Inventor: Hans R. Dorfi, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 81 days.

(21) Appl. No.: 13/670,014

(22) Filed: Nov. 6, 2012

(65) Prior Publication Data

US 2013/0111984 A1    May 9, 2013

Related U.S. Application Data

(60) Provisional application No. 61/556,847, filed on Nov. 8, 2011, provisional application No. 61/557,938, filed on Nov. 10, 2011.

(51) Int. Cl.
*G01M 17/02* (2006.01)

(52) U.S. Cl.
CPC ................... *G01M 17/027* (2013.01)
USPC ............................................................ 73/146

(58) Field of Classification Search
USPC ............................................. 73/146–146.8
See application file for complete search history.

(56) References Cited

U.S. PATENT DOCUMENTS

| | | | | |
|---|---|---|---|---|
| 5,777,219 A | * | 7/1998 | Popio et al. | 73/146 |
| 2003/0029235 A1 | * | 2/2003 | Yurjevich | 73/146 |
| 2011/0056284 A1 | * | 3/2011 | Hanada et al. | 73/146 |
| 2012/0048006 A1 | * | 3/2012 | Koguchi et al. | 73/146 |
| 2013/0068006 A1 | * | 3/2013 | Cuttino | 73/118.01 |

FOREIGN PATENT DOCUMENTS

| | | |
|---|---|---|
| JP | 2005024365 A | 1/2005 |
| JP | 2005132156 A | 5/2005 |
| JP | 2007230328 A | 9/2007 |

* cited by examiner

*Primary Examiner* — Andre Allen

(74) *Attorney, Agent, or Firm* — Shaun J. Fox; John Skeriotis

(57) ABSTRACT

Provided is an apparatus for testing an associated tire. The apparatus may comprise a substantially transparent test platform. The test platform may comprise a low friction test surface. The low friction test surface may comprise a layer of lubricant. The layer may be less than 3 millimeters thick The apparatus may further comprise an optic or acoustic data acquisition system or appliance. The optic or acoustic data acquisition system or appliance may comprise either a camera positioned to view the test surface through the substantially transparent test platform, or ultrasonic equipment positioned to acquire data regarding the test surface through the substantially transparent test platform.

20 Claims, 2 Drawing Sheets

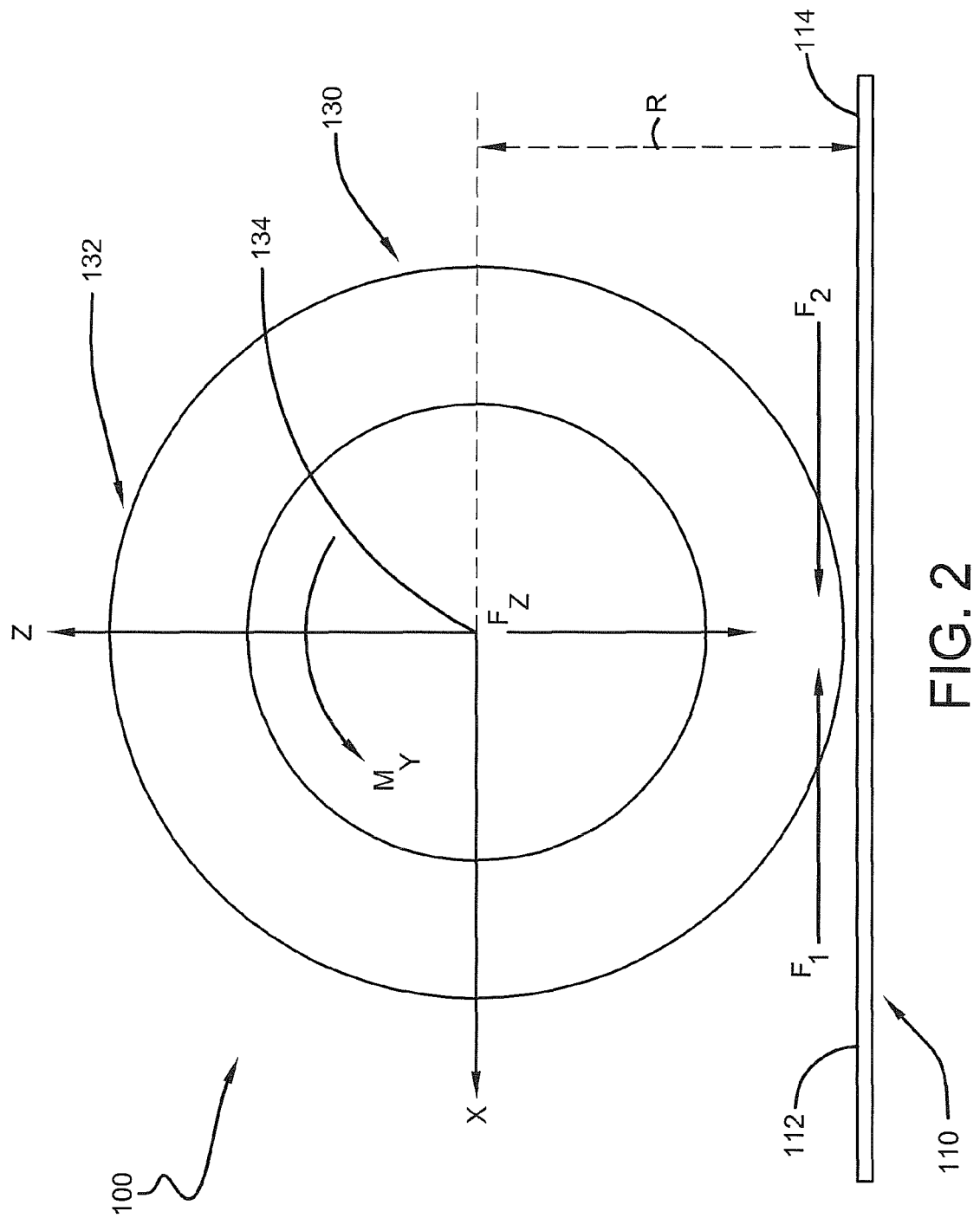

FOOTPRINT TEST APPARATUS AND METHOD OF USE

CROSS-REFERENCE TO RELATED APPLICATIONS

This application claims priority to and any other benefit of U.S. Provisional Patent Application Ser. No. 61/556,847 filed Nov. 8, 2011 entitled "Footprint Test Apparatus And Method Of Use" and U.S. Provisional Patent Application Ser. No. 61/557,938 filed Nov. 10, 2011 entitled "Footprint Test Apparatus And Method Of Use", the entire disclosures of which are incorporated by reference herein.

TECHNICAL FIELD

The present subject matter relates generally to tire testing. More, specifically, the present subject matter relates to apparatuses and methods for testing tire footprints.

BACKGROUND

Tire performance is an important concern. Manufacturers and tire developers, as well as others in the industry, find that the methods for testing (1) tire characteristics; (2) performance of tire-vehicle systems, and (3) performance of components of tire-vehicle systems are of substantial interest.

The footprint of a tire has a substantial influence on tire performance, including tire wear, driving stability, noise, and ride comfort. Accordingly, there is interest in measurement of the qualities of the footprint of a tire.

Various tests have been designed to determine the footprint of a tested tire. These tests involve means of observing or sensing the footprint as it rolls over the measurement surface. Tests conducted outdoors on vehicles driving over measurement surfaces require expensive test instrumentation and may have limited repeatability due to the variability of driving conditions. Such testing is therefore expensive and time consuming. In order to avoid the expense and time of outdoor tire test procedures, some indoor tire test equipment has been developed. Indoor test equipment has mostly been limited to footprint testing of non-rolling tires or at low rolling speeds. Tire operation, however, may be at speeds other than at low speeds, such as, without limitation, high speeds, such as, without limitation, highway speeds. The current methods and apparatuses are not readily adaptable to use at different speeds or use at different operating conditions, such as highway speed. It remains desirable to develop apparatuses and methods for measurement of the qualities of the footprint of a tire at high speeds.

SUMMARY

Provided is an apparatus for testing an associated tire. The apparatus may comprise a substantially transparent test platform. The test platform may comprise a low friction test surface. The low friction test surface may comprise a layer of lubricant. The layer may be less than 3 millimeters thick The apparatus may further comprise an optic or acoustic data acquisition system or appliance. The optic or acoustic data acquisition system or appliance may comprise either a camera positioned to view the test surface through the substantially transparent test platform, or ultrasonic equipment positioned to acquire data regarding the test surface through the substantially transparent test platform.

Further provided is a method for conducting footprint tests on an associated tire. The method may comprise providing an apparatus for conducting footprint tests on an associated tire. The apparatus may comprise a substantially transparent test platform comprising a low friction test surface, an optic or acoustic data acquisition system or appliance, and a tire mounting support adapted for preventing substantial horizontal movement of an associated tire. The optic or acoustic data acquisition system or appliance may comprise a camera positioned to view the test surface through the substantially transparent test platform, or ultrasonic equipment positioned to acquire data regarding the test surface through the substantially transparent test platform.

Further provided is an apparatus for conducting footprint tests on an associated tire. The apparatus may comprise a low friction test surface, wherein the test surface may comprise a substantially transparent, substantially planar, glass, polycarbonate, poly methyl methacrylate, or sapphire test platform comprising a low friction test surface. The apparatus may further comprise an optic or acoustic data acquisition system or appliance, and a tire mounting support engaged with the test platform. The test surface may comprise a layer of a low viscosity liquid lubricant. The lubricant may comprise mineral oil. The layer may be less than 500 micrometers thick. The optic or acoustic data acquisition system or appliance may comprise either a camera positioned to view the test surface through the substantially transparent test platform, or ultrasonic equipment positioned to acquire data regarding the test surface through the substantially transparent test platform. The tire mounting support may comprise means to prevent an associated tire from rolling while still permitting the associated tire to rotate with a rotation rate equivalent to a speed greater than 45 mph, and means to provide a normal force between a tread of the associated tire and the test surface. The coefficient of friction between the test surface and the associated tire is less than or equal to 0.2.

BRIEF DESCRIPTION OF THE DRAWINGS

FIG. 2 is a side view of a schematic showing part of a footprint test apparatus, an associated tire, and some of associated forces and moments acting therebetween.

DETAILED DESCRIPTION

Figure 1:
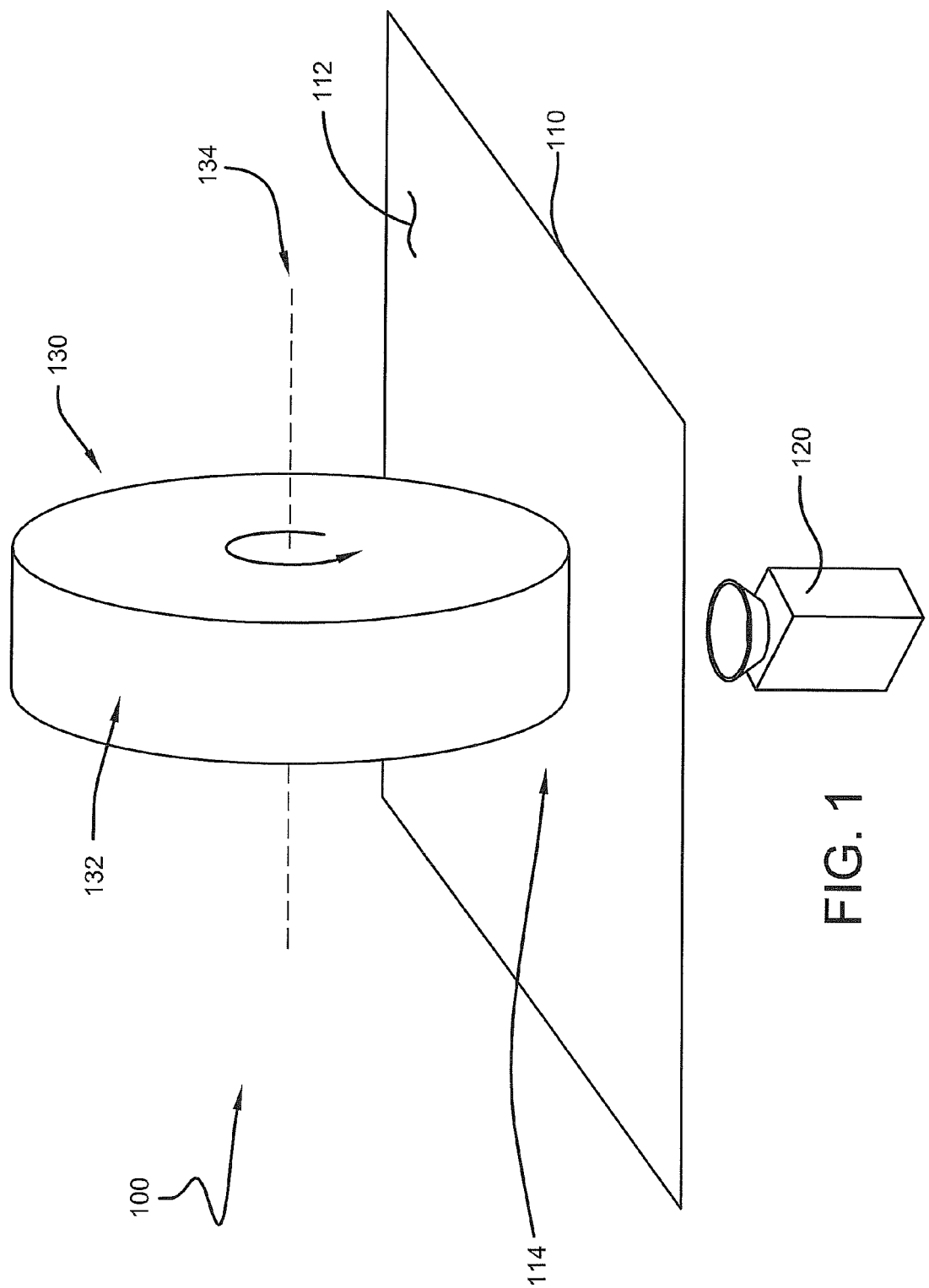
FIG. 1 is a perspective view of a schematic showing a footprint test apparatus and an associated tire.

Reference will be made to the drawings, FIGS. 1 and 2, wherein the showings are only for purposes of illustrating certain embodiments of a footprint test apparatus and methods of using same.

A first embodiment of the footprint test apparatus is indicated generally at 100 and is shown in FIG. 1. Apparatus 100 comprises a substantially transparent test platform 110, and an optic or acoustic data acquisition system or appliance 120. The substantially transparent test platform 110 of apparatus 100 comprises a test surface 112.

As used herein, unless otherwise noted, "substantially transparent" means sufficiently transparent to permit the acquisition of usable optic test data, or usable acoustic test data in the ultrasonic frequency range, therethrough. For most testing purposes, the test platform need not be optically or acoustically perfect. The test platform 110 may comprise materials that transmit and slightly diffuse light or acoustic waves passing therethrough, materials that transmit and slightly filter, color, tint, refract, reflect, absorb, or otherwise slightly alter light or acoustic waves passing therethrough. The test platform 110 may comprise clear materials, tinted materials, materials comprising lenses, materials that polarize light, materials comprising filters, materials comprising minor inclusions, materials comprising slight imperfections, or materials that transmit and slightly diffuse light or acoustic waves passing therethrough. The test platform 110 may comprise glass, polycarbonate, poly(methyl methacrylate), sapphire, steel or aluminum.

In general, the footprint test apparatus may comprise optically or acoustically substantially transparent test platform 110, which allows observation of the footprint through optical cameras or ultrasonic sensing of the contact patch. In certain embodiments, an optic or acoustic data acquisition system or appliance 120 may comprise a camera or ultrasonic equipment.

In certain embodiments, the optic or acoustic data acquisition system or appliance 120 comprises a camera 120, the camera may be positioned to view the test surface 112 through the transparent test platform 110. The camera 120 may be any sort of device that is capable of acquiring optic data, wherein said optic data comprises video or photographic images of the footprint of the associated tire 130. Without limitation, camera 120 may be a digital camera, a video camera, a film camera, or otherwise.

In certain embodiment, the optic or acoustic data acquisition system or appliance 120 comprises ultrasonic equipment 120. Conventional ultrasonic equipment is sufficient to acquire ultrasonic acoustic data. It is possible to employ a common ultrasonic pulser/receiver coupled to an appropriate transducer. The common ultrasonic pulser/receiver may be of the kind used for routine nondestructive testing. Without limitation, a 10 MHz longitudinally focused immersion probe may be used. A probe may optionally be immersed in water at a suitable distance to focus the ultrasonic beam on the region of interest. The probe may be moved by a three-dimensional scan system and connected to a pulser/receiver. The ultrasonic signal received from the contact interface may be monitored using an oscilloscope. The values of the ultrasonic reflection may optionally be stored in text matrices for further postprocessing procedures. Either the scan system or the detector or both may be controlled by a conventional digital computer with appropriate software. In some embodiments, a conventional digital computer with the appropriate software may enable: 1) acquisition of data from the oscilloscope of the ultrasonic signal; 2) control of the probe movement in real-time to acoustically scan the test surface; 3) processing of ultrasonic data in real-time by graphically displaying the detected contact area. Data may be acquired via Ethernet connections, or other conventional data transmission methods whether wireless or otherwise. The subsequent graphical postprocessing of the matrices allows preliminary evaluation of the contact conditions. The regions in which the coefficient of reflection is lower are related to better contact conditions, while toward the edge of the contact area the reflection coefficient of the acoustic signal increases to the unity value, which corresponds to absence of contact. Transformation of the raw ultrasonic data into contact pressure distribution may be carried out by means of a calibration procedure, which may be used to establish an empirical reflection versus pressure relationship, established on the basis of experiments carried out on a known contact situation. Once obtained, the calibration curve may be transferred to the tire-ground reflection matrices, thus converting them into contact pressure maps or maps otherwise defining the contact geometry.

A test platform may take a variety of forms. In the embodiment shown in FIG. 1, the test platform 110 is substantially planar. In other embodiments, the test platform may comprise other geometries to simulate other roadway features or to provide different test conditions. For example and without limitation, a test platform may be slightly convex, may be slightly concave, may comprise a protrusion, or may comprise a cavity.

A test surface may take a variety of forms. In use, a test surface will perform as a low friction surface. As used herein, unless otherwise noted a "low friction surface" is a surface for which the coefficient of friction, $\mu$, between the surface 112 and an associated tire to be tested 130, is less than or equal to 0.2; that is, $\mu \leq 0.2$. The above described "low friction surface" is one that may be established by impregnating the test surface 112 with friction-modifying materials or by providing lubrication as is disclosed herebelow.

One method by which a low friction surface may be established is by lubrication of the test surface 112. A low friction surface may be established by applying a layer of lubrication to the test surface 112. In the embodiment shown in FIGS. 1 and 2, the layer of the lubricant 114 is very thin, so thin that it is not visibly distinct from the underlying test platform 110. In certain embodiments, and without limitation, the layer of the lubricant 114 may be less than 3 millimeters thick, less than 1 millimeter thick, less than 500 micrometers thick, less than 100 micrometers thick, less than 50 micrometers thick, less than 10 micrometers thick, or less than 1 micrometer thick. The lubricant used for lubrication of the test surface may be a low viscosity, liquid lubricant. A low viscosity lubricant is a lubricant of sufficiently low viscosity that the viscous properties of the lubricant do not create effects, such as, without limitation, foam, strands, or remnants, that would either substantially distort the footprint characteristics or substantially distort or occlude optic or acoustic data acquisition of the footprint characteristics. There are a large number of acceptable lubricants. In some embodiments, the lubricant may be a mineral oil, a vegetable oil, a synthetic oil, a glycerine-based lubricant or alcohol-based lubricant.

In the embodiment shown in FIGS. 1 and 2, the associated tire 130 comprises a tread region 132 about the circumference of associated tire 130, an axis of rotation 134 is defined by the center of the wheel (not shown) onto which the associated tire 130 is mounted. The associated tire 130 may be rotated about the axis of rotation 134.

With reference to FIGS. 1 and 2, during use, an associated tire 130 may be engaged with apparatus 100. Engagement of associated tire 130 with the footprint testing apparatus 100 may take a variety of forms. In certain embodiments, the footprint test apparatus may comprise a tire mounting support (not shown) adapted to engage the associated tire 130 with the footprint test apparatus 100. A tire mounting support (not shown) may comprise means to hold an associated tire 130 in a fixed location with respect to the test platform 110 while still permitting said associated tire 130 to rotate about axis 134. Means to hold an associated tire 130 in a fixed location with respect to the test platform 110 while still permitting said associated tire 130 to rotate about axis 134 may comprise a frame, structure, or other support engaged to the apparatus 100 either directly or indirectly and rotatably engaged with a spindle bolting plate (not shown) or other member adapted to engaged a wheel or rim (not shown) to which an associated tire 130 is mounted. A tire mounting support (not shown) may also comprise means to provide loaded contact between a tread 132 of said associated tire 130 and the test surface 112. Means to provide loaded contact between a tread 132 of said associated tire 130 and the test surface 112 may comprise a mechanical system adapted to apply a force or moment to the associated tire 130, such as, without limitation, a normal force, $F_z$, or a driving moment, $M_y$, or some combination thereof. A mechanical system adapted to apply a force or moment to the associated tire 130 may comprise a hydraulic system, a pneumatic system, a motor, an actuator, a screw, a weight, or some combination thereof. In certain embodiments, a tire mounting support (not shown) may comprise a load frame (not shown) adapted to load the associated tire 130 against the test surface 112. In certain embodiments, a tire mounting support (not shown) may comprise a load frame (not shown) adapted to apply a torque or moment to the associated tire 130.

In certain embodiments, an applied normal force is representative of the normal force to which the associated tire 130 is exposed during use or testing on a vehicle. Without limitation, in certain embodiments, an applied normal force, may be in the range of 200-2000 lbs where the associated tire is a passenger tire. Without limitation, in certain embodiments, an applied normal force, may be in the range of 200-7000 lbs where the associated tire is a truck tire.

While in typical usage a tire may be rotated in such a manner that it will roll, and thereby be translated along and amongst a set of locations, in some methods of testing using the present apparatus, the associated tire 130 may be rotated while being held in a fixed location such that the associated tire 130 slips on the engaged test surface 112 rather than rolls across the engaged test surface 112. This performance may also be described in terms of the slip rate. Slip rate is the percentage of the difference between the surface speed of tire compared to the speed between axis and test surface, so that Slip Rate=$(\omega r - v)/v$, where $\omega$ is the rotational speed of the tire, r is tire rolling radius and v is the translational speed of the wheel. Accordingly, the slip rate of a tire that rolls along a test surface without slipping would be 0. By contrast, the slip rate of a tire that rotates without translating would be infinite. A tire that has any substantial rotation speed and radius but a very small or near zero translation speed due to substantial slippage will have a very high slip rate. As used herein, unless otherwise noted, a "very high slip rate" includes both very large finite slip rates and infinite slip rates.

As shown in FIG. 2, a force or moment applied to the associated tire 130 may comprise the application of a normal force, $F_z$, or application of a driving moment $M_y$, or some combination thereof. The application of a driving moment $M_y$, acting over the distance of the tire radius, R, yields a force, $F_1$, acting on the test platform 110 in the direction of the negative x-axis having a magnitude defined by the equation: $M_y \approx R(F_1)$. The force, $F_1$, is opposed by a frictional force, $F_2$, acting on the associated tire 130 and having the same magnitude as $F_1$ but with a direction antiparallel to $F_1$. $F_2$ is limited to the maximum frictional force $F_{max}$ defined by the equation $F_{max}=\mu(F_z)$. When $F_2$ reaches $F_{max}$, the associated tire 130 will rotate with respect to platform 110. Where the associated tire is fixed from translating or rolling with respect to platform 110, the rotation of the associated tire 130 will result in it slipping. A slipping tire will slip against rather than roll along platform 110 when rotating.

In the embodiment shown in FIG. 1, the associated tire 130 is engaged with apparatus 100 by loading the tire tread onto the test surface 110 to create a footprint contact patch between the associated tire 130 and test surface 110. By using a tire mounting support (not shown) or other system to hold an associated tire in a fixed location with respect to the test platform, the tire may be induced to rotate at some desired rotation speed and to slip on the low friction test surface 112 such that the tire will be spun in place over the test surface 112, so that the footprint of the associated tire 130 on the test surface 112 may be observed or recorded through transparent test platform 110 by camera 120. In some tests, the desired rotation speed may be representative of highway speeds, such as, without limitation, 10-20 rotations per second or a rotation rate equivalent to highway speeds as determined from the equation $f=v/(2\pi r)$, where v represents the highway speed, r the tire rolling radius and f the rotation rate. In some tests, the speed, v, may be anywhere in the range from zero to a racing speed such as, 200 mph. In some tests, the speed, v, may be anywhere in the range from 45 mph to 85 mph. In some tests, the speed, v, may be anywhere in the range from 5 mph to 120 mph.

While the footprint test apparatus and methods of using same have been described above in connection with certain embodiments, it is to be understood that other embodiments may be used or modifications and additions may be made to the described embodiments for performing the same function of the footprint test apparatus and methods of using same without deviating therefrom. Further, the footprint test apparatus and methods of using same may include embodiments disclosed but not described in exacting detail. Further, all embodiments disclosed are not necessarily in the alternative, as various embodiments may be combined to provide the desired characteristics. Variations can be made by one having ordinary skill in the art without departing from the spirit and scope of the footprint test apparatus and methods of using same. Therefore, the footprint test apparatus and methods of using same should not be limited to any single embodiment, but rather construed in breadth and scope in accordance with the recitation of the attached claims.

What is claimed is:

1. An apparatus for testing an associated tire, comprising:
 a transparent test platform comprising a low friction test surface, wherein said low friction test surface comprises a layer of lubricant, said layer being less than 3 millimeters thick; and
 an optic or acoustic data acquisition system or appliance comprising either, a camera positioned to view said test surface through said transparent test platform, or ultrasonic equipment positioned to acquire data regarding said test surface through said transparent test platform.

2. The apparatus of claim 1, wherein said test platform is planar.

3. The apparatus of claim 2, wherein said layer is less than 500 micrometers thick.

4. The apparatus of claim 3, wherein said test platform comprises glass, polycarbonate, poly methyl methacrylate, sapphire, steel or aluminum.

5. The apparatus of claim 4, wherein said lubricant comprises a low viscosity liquid lubricant.

6. The apparatus of claim 5, wherein said lubricant comprises mineral oil, vegetable oil, a synthetic oil, a glycerin-based lubricant or an alcohol-based lubricant.

7. The apparatus of claim 6, further comprising a tire mounting support.

8. The apparatus of claim 7, wherein said tire mounting support comprises means to prevent an associated tire from rolling while still permitting said associated tire to rotate.

9. The apparatus of claim 8, wherein said tire mounting support comprises means to provide a normal force between a tread of said associated tire and the test surface.

10. The apparatus of claim 9, wherein the coefficient of friction between said test surface and said associated tire is less than or equal to 0.2.

11. A method for conducting footprint tests on an associated tire, providing an apparatus for conducting footprint tests on an associated tire, said apparatus comprising:
 a transparent test platform comprising a low friction test surface, wherein said low friction test surface comprises a layer of lubricant, said layer being less than 3 millimeters thick, an optic or acoustic data acquisition system or appliance comprising either,
a camera positioned to view said test surface through said transparent test platform, or ultrasonic equipment position to acquire data regarding said test surface through said transparent test platform; and
a tire mounting support adapted for preventing horizontal movement of an associated tire.

12. The method of claim 11, further comprising, mounting an associated tire to said tire mounting support.

13. The method of claim 12, further comprising, lubricating said test surface such that the coefficient of friction between said test surface and said associated tire is less than or equal to 0.2.

14. The method of claim 13, further comprising, providing a loaded footprint between a tread of said associated tire and the test surface.

15. The method of claim 14, further comprising, using said optic or acoustic data acquisition system or appliance to capture information about said loaded footprint.

16. The method of claim 15, further comprising, rotating said associated tire in such a way that said associated tire rotates with a very high slip ration.

17. The method of claim 16, further comprising, rotating said associated tire in such a way that said associated tire rotates with a rotation rate equivalent to a speed greater than 45 mph.

18. The method of claim 17, wherein said very high slip ratio is established by rotating the tire while preventing horizontal movement of the associate tire.

19. The method of claim 18, wherein
said test platform is planar and comprises glass, polycarbonate, poly methyl methacrylate or sapphire; and
lubricating said test surface comprises application of a lubricant or alcohol based lubricant.

20. An apparatus for conducting footprint tests on an associated tire, comprising:
a transparent, planar, glass, polycarbonate, poly methyl methacrylate, or sapphire test platform comprising a low friction test surface, said test surface comprising a layer of a low viscosity liquid lubricant, said lubricant comprising mineral oil, said layer being less than 500 micrometers thick;
an optic or acoustic data acquisition system or appliance comprising either,
a camera positioned to view said test surface through said transparent test platform, or
ultrasonic equipment positioned to acquire data regarding said test surface through said transparent test platform;
a tire mounting support engaged with said test platform, said tire mounting support comprising,
means to prevent an associated tire from rolling while still permitting said associated tire and the test surface;
wherein the coefficient of friction between said test surface and said associated tire is less than or equal to 0.2.

* * * * *